J. J. AND O. J. KRIEL.
COTTON CHOPPER.
APPLICATION FILED NOV. 16, 1918.
1,340,057.
Patented May 11, 1920.
4 SHEETS—SHEET 3.
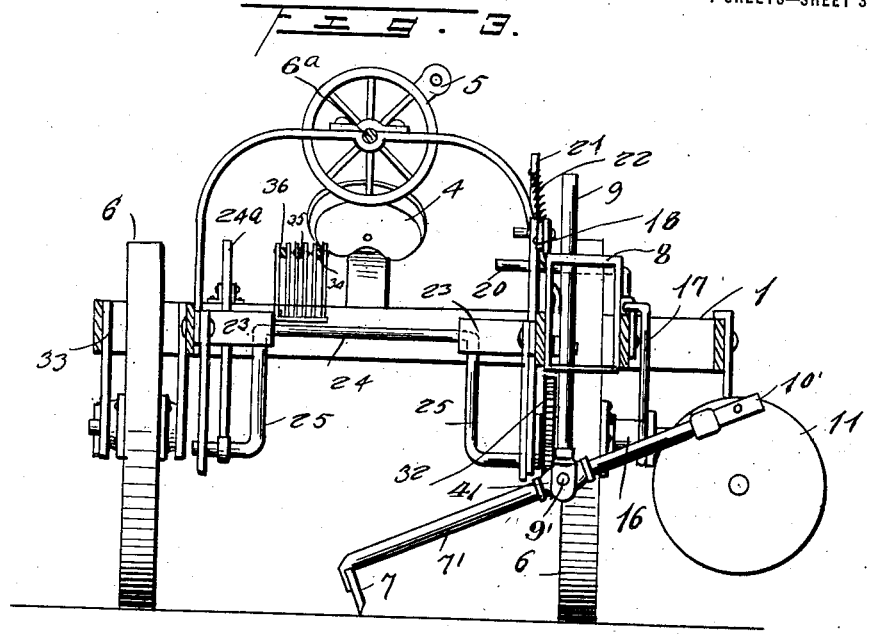
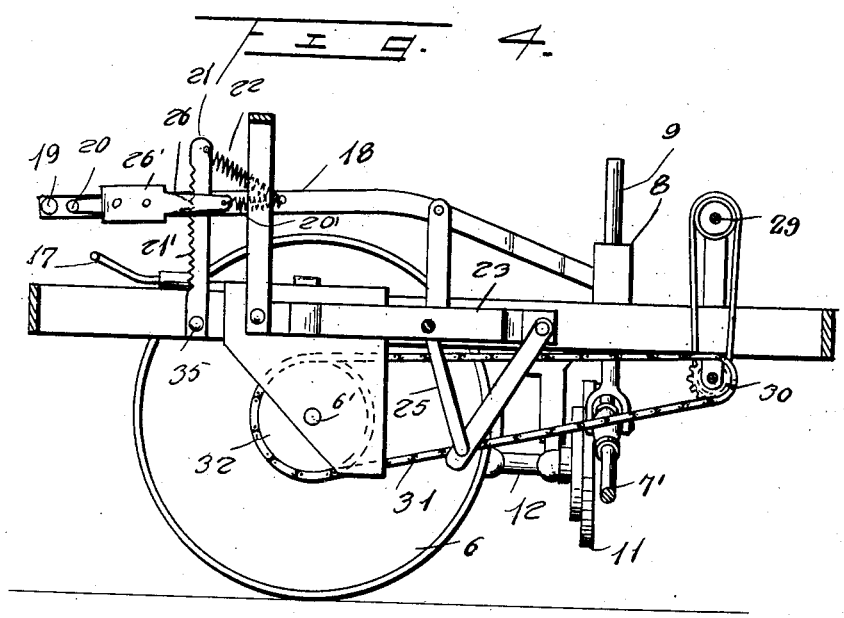
Inventor
O. J. Kriel & J. J. Kriel
By
*[signature]* Attorney

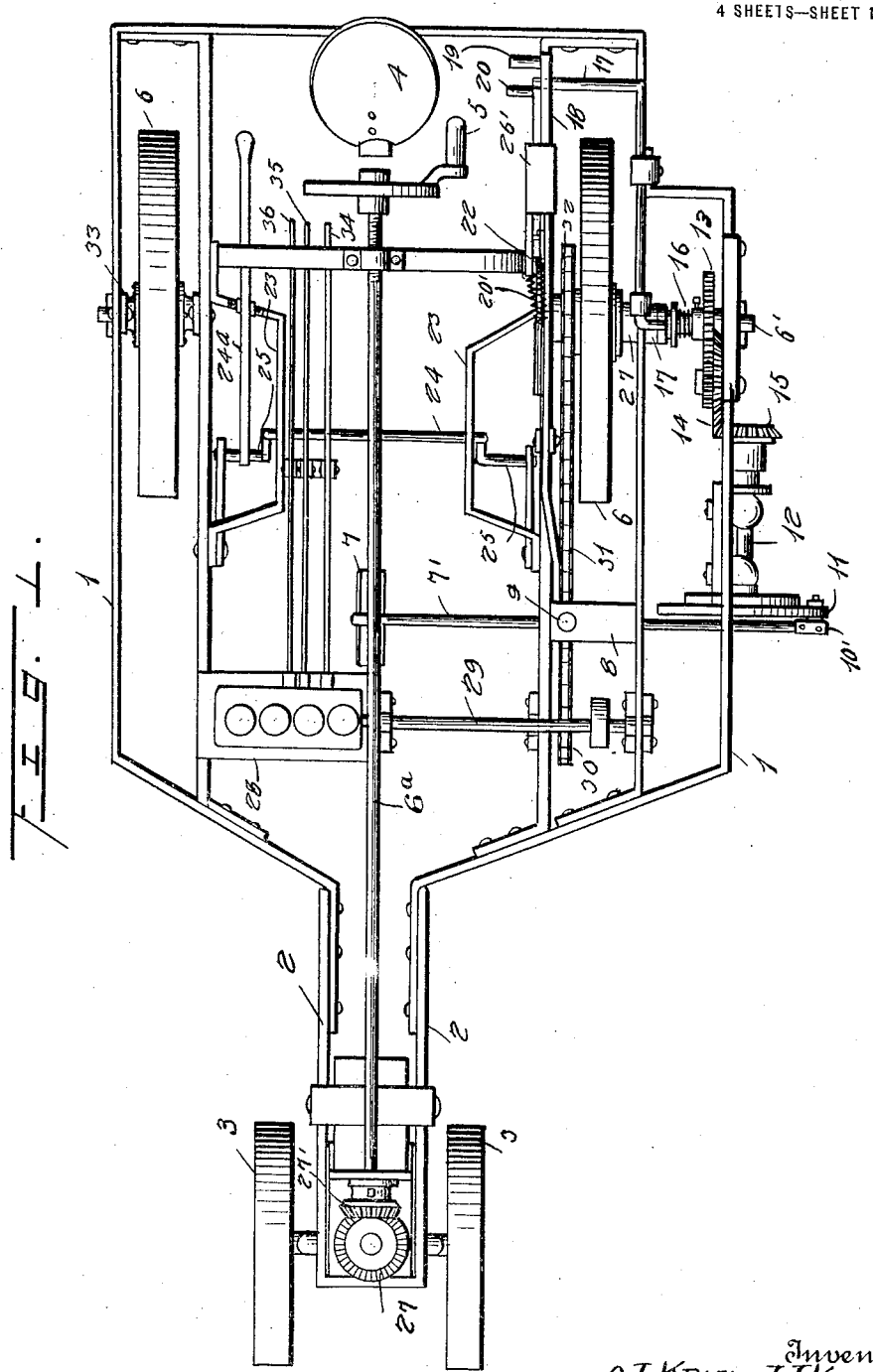

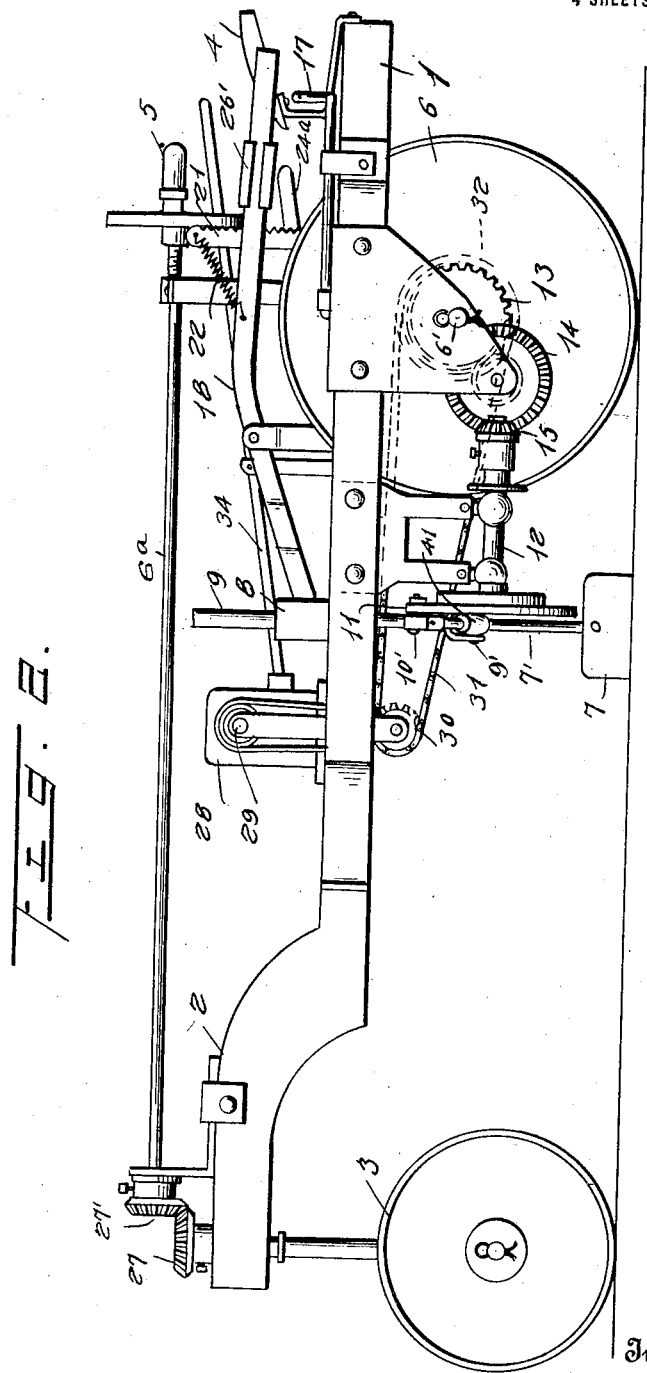

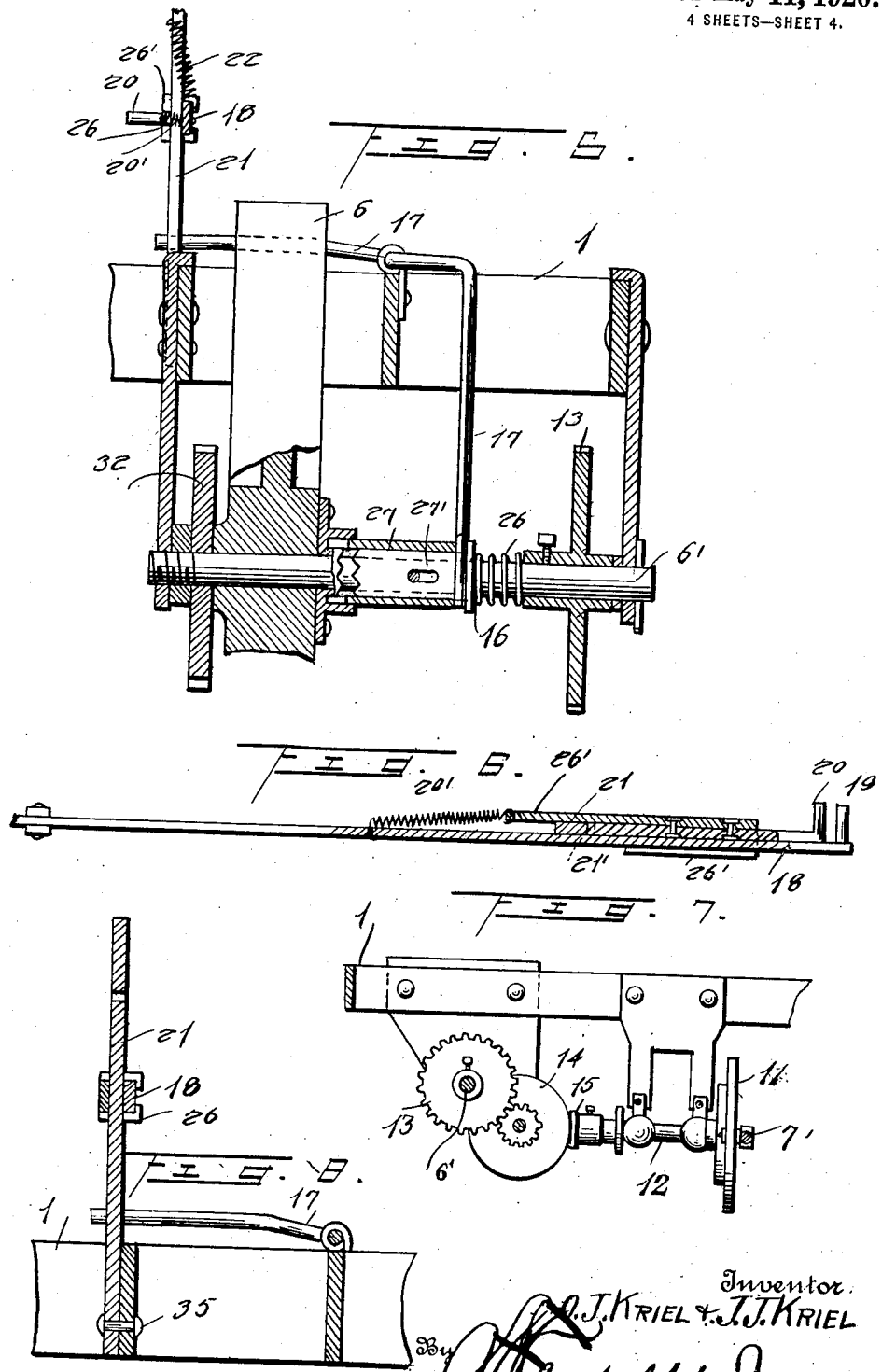

UNITED STATES PATENT OFFICE.

JOHN J. KRIEL AND OTTO J. KRIEL, OF TAYLOR, TEXAS.

COTTON-CHOPPER.

1,340,057.  Specification of Letters Patent.  Patented May 11, 1920.

Application filed November 16, 1918. Serial No. 262,869.

*To all whom it may concern:*

Be it known that we, JOHN J. KRIEL and OTTO J. KRIEL, citizens of United States, residing at Taylor, in the county of Williamson and State of Texas, have invented certain new and useful Improvements in Cotton-Choppers; and we do hereby declare the following to be a full, clear, and exact description of the invention, such as will enable others skilled in the art to which it appertains to make and use the same.

This invention refers generally to means for treating and working the soil for agricultural purposes, and the invention refers in particular to means of destroying the coherence of ridges used for the planting and growing of cotton at certain points between the individual plants, and at the same time cultivating the soil in the vicinity of these ridges. Such devices are generally known in the art as cotton choppers, and the invention has for its object to devise a particularly advantageous kind of cotton chopper which will be adjustable in accordance with the distance apart of the rows or ridges and in accordance with the desired spacing of plants.

The invention has also for its object to so construct the chopping and soil-treating means that they may be easily engaged or disengaged with the propelling means, and it is a further object of the invention to vary and adjust the working radius of the chopping tool and to adjust the depths to which it will penetrate the soil.

The invention also devises means of distributing the load on the carrying frame of the device so as to equalize said load and thereby to remove undue and unequal pressure upon the soil-treating and soil-improving devices.

Other objects and advantages of the invention will appear from the drawings and specification.

A preferred form of a device embodying my invention is shown on the accompanying drawings, in top plan view in Figure 1 of the drawing, Fig. 2 is a side view of Fig. 1, Fig. 3 is a transverse section taken on a plane in advance of the hoe and looking rearwardly, Fig. 4 is a detail fragmentary longitudinal section, showing the hoe-operating mechanism, Fig. 5 is a detail section, illustrating in particular the control clutch for the hoe-operating mechanism.

Fig. 6 is a detail, partly in section, of the hoe-adjusting lever,

Fig. 7 illustrates the operating gear for the hoe or other soil-treating device used in connection with our invention, and Fig. 8 is a detail view, partly in section, of the lever for adjusting the hoe and the clutch lever and associated parts.

In the drawings 1 indicates generally the main frame of the device upon which the propelling and operating means and the seat 4 for the operator and the propelling wheels 6 are mounted. 2 is a forward, preferably somewhat narrower and centrally located extension of the frame upon which the steering wheels 3 are arranged, which are operably connected to a train of gearing 27, 27', from which an operating shaft 6$^a$ extends longitudinally of the main frame and is provided with a handle 5 within reach of the operator seated for instance at 4. The soil-treating device is shown in the preferred form of construction as being formed like a hoe 7 extending at right angles from both sides of the rod 7', and disposed substantially parallel to the direction of travel of the machine. 9 is a vertically movable rod to the lower end of which the rod 7' is pivoted at 9' intermediate its ends in a manner to be described. 8 is a guide frame mounted upon the main frame 1 of the machine and allowing of vertical reciprocation of the rod 9. The other end of the rod 7 is eccentrically pivoted to a disk 11 at 10', so that by the rotation of this disk the rod 7' and the hoe 7 attached thereto will be given a crank arm movement in a vertical plane substantially at right angles to the longitudinal extension of the frame of the machine. Movement is imparted to the disk 11 by means of the shaft 12, and the gear wheels 13, 14 and 15, of which the gear wheel 13 is connected to the rear axle of the wheels 6 by any suitable kind of coupling device, such as shown, for instance, at 27, 27' and 16 in Fig. 5 of the drawing. 17 is a clutch lever, one end of which straddles the sleeve 27 upon the wheel axle 6' along which it is guided in the usual manner by means of a pin and slot 27'. The coupling lever 17 extends rearwardly and upwardly within easy reach of the operator. A substantially longitudinally extending lever 18 is pivotally mounted upon this side of the frame of the machine, as shown at 18', the forward end of which is pivotally secured to the vertically reciprocating rod 9, as shown at 18 in Fig. 3, while the rear end of the lever 18 is provided with a handle 19 within easy reach of the operator. A sliding pawl 26 is slidingly arranged by means of a guide 26' along the longitudinally extending lever 18 and is provided with an operating handle 20, and at its other end with a spring 20', the other extremity of which spring is secured to the lever 18. This pawl 26 is capable of engagement with the teeth 21' of a vertical bar or rod 21, pivoted at 35 to the side frame of the machine and the free end of which is connected to the lever 18 by means of a coil spring 22. By this means the pivoted bar 21 acts both as a guide in the upward and downward movement of the lever 18 and as a means to lock the same in any desired position by means of the engagement of the pawl 26 with the teeth 21'. In the preferred form of construction shown in the drawings, the free end of the coupling lever 17, above referred to, extends within the vertical plane of the longitudinal lever 18, so that by depressing this lever to the extremity of its downward movement the coupling lever 17 and the coupling 16 will also be operated and the hoe-operating gear will become disengaged from the wheel axle 6', while the hoe itself will be raised by the other forwardly extending part of the lever 18.

Movement may be imparted to the wheels by draft animals as well as by a suitable motor engine, which, in this case, in order to balance the weight of the chopper and its operating mechanism is preferably arranged at the side of the frame 1 opposite the side upon which the chopper and its operating devices are mounted. From the motor 28 a shaft 29 transmits the power to a pulley or a gear wheel or the like 30, which may be provided with a suitable kind of coupling in order to connect and disconnect the motor engine with and from the intermediate pulley 30'. A belt 31 transmits the power from the pulley 30 to a wheel 32 upon the wheel axle 6'. 34, 35 and 36 indicate respectively the sparking lever, the gear lever and the operating lever of the motor engine, all of which are arranged at the side opposite that on which the chopping mechanism is arranged and within the reach of the operator.

25 indicates the end arms of a U-frame 24 for the cultivator beams, which may be of any desired construction, being in the shape of rakes or similar or equivalent means not shown in the drawings. 24ª is the cultivator lever for operating the cultivating implements and mounted upon the motor-carrying side of the machine. By means of this arrangement it is possible to chop the ground and arrange the configuration of the lateral plant bearing ridges at the same time with the cultivating, raking or harrowing of the soil.

33 are guard rails preferably arranged on both sides of the driving wheels 6.

The device is operated by driving the machine between the plant bearing ridges of the ground and operating the cultivator and the hoe as required. The hoe 7 may be raised and lowered by proper movement of the lever 18 to raise or lower the rod 9, so that it will chop deeper or shallower, as required.

In the preferred form of construction shown in the drawings, the hoe handle 7' is slidable through a sleeve 41 pivoted, as at 9', in a fork shaped portion of the vertical rod 9, but other means, adapted to allow of a sliding and angular movement of the handle 7', and not shown in the drawing, may be also employed.

Having thus described our invention, what we claim is:

1. In a cotton chopper, a supporting frame, chopping means carried thereby, means for operating said chopping means, a control clutch interposed between said operating means and the chopping means, a vertically adjustable support for the chopping means, an adjusting lever for raising and lowering said support, and an operating lever connected to said clutch and interposed in the path of movement of said adjusting lever so as to be engaged thereby when said support is raised into its uppermost position, said clutch lever actuating the clutch when rocked by the adjusting lever so as to disconnect the chopper from the operating means therefor, the clutch being adapted to establish operating connection between said chopper and said operating means when the clutch lever is released.

2. In a soil and plant-treating machine, the combination with a frame and propelling means on said frame, of depressible and elevatable soil-treating and cultivating means on said frame, an adjusting lever for said cultivating means, a soil-treating crank arm extending across a portion of the frame and at an angle to the direction of movement of the same, a crank disk at one end of said arm, an adjustable support on said frame, guiding means on said support for the reception of said crank arm, an adjusting lever connected to said support, locking means operatively connected to said support-operating lever, and coupling means intermediate the crank disk and the propelling means.

3. In a soil and plant-treating machine, the combination with a frame and propelling means on said frame, of depressible and elevatable soil-treating and cultivating means on said frame, operating means for said cultivating means, a soil-treating crank arm having a throw at an angle to the direction of movement of the frame, soil-loosening means at the end of said crank arm and at an angle thereto, a crank disk at the other end of said arm, an adjustable support on said frame, guiding means on said support for the reception of said crank arm, an adjusting lever connected to said support, locking means operably connected to said support-adjusting lever, and coupling means intermediate the crank disk and the propelling means, and a coupling lever for said coupling means engageable with said support-adjusting lever.

4. In a soil and plant-treating machine, the combination with a frame and propelling means on said frame, of downwardly and upwardly movable soil-treating and cultivating means mounted at one side of said frame, motion-generating means on said side, an adjusting lever for said cultivating means, a soil-treating crank arm having a throw at an angle to the direction of movement of the frame, soil-loosening means at the end of said crank arm and substantially parallel to the sides of the frame, a crank disk at the other end of said arm and adapted to impart a swinging movement to said arm in a plane at right angles to said frame, and mounted on the opposite side of the frame, an adjustable support on said side, guiding means on said support for the reception of said crank arm, an adjusting lever connected to said support, and means connecting the propelling means to said motion-generating means.

5. In a soil and plant-treating device as set forth in claim 4, coupling means intermediate the crank disk and the propelling means, and a coupling lever on said coupling and engageable with said support-adjusting lever.

6. In a cotton chopper, the combination with a frame and propelling means on said frame, of adjustable and rockable soil-treating and cultivating means mounted at one side of said frame, motion-generating means on said side, an adjusting lever for said cultivating means, a soil-treating crank arm having a throw at an angle to the direction of movement of the frame, a downwardly directed hoe at the end of said crank arm and substantially parallel to the side of the frame, a crank disk at the other end of said arm and adapted to impart a swinging movement to said arm in a plane at right angles to said frame and mounted on the opposite side of the frame, an adjustable support on said frame, guiding means on said support for rockingly and slidably supporting said hoe-carrying arm, an adjusting lever connected to said support, locking means operably connected to said lever, and coupling means intermediate the crank disk and the propelling means.

7. In a soil and plant-treating machine, the combination with a frame and propelling means on said frame, of adjustable, depressible and elevatable soil-treating and cultivating means mounted on one side of said frame, motion-generating means on said side, an adjusting lever for said cultivating means, a soil-treating crank arm extending and movable in a vertical plane substantially at right angles to the direction of propulsion, means to adjust the length of the throw of said crank arm, a downwardly directed hoe secured to the end of said crank arm, a crank disk at the other end of said arm and adapted to impart an oscillating movement to said arm and mounted on the opposite side of the frame, an adjustable support on said frame, guiding means on said support for rockingly and slidably supporting said hoe-carrying crank arm, an adjusting lever connected to said support, locking means operably connected to said support-adjusting lever, and coupling means intermediate the crank disk and the propelling means.

8. In a soil-treating machine, the combination with a frame and propelling means on said frame, of adjustable and movable soil-treating and cultivating means upon said frame, operating means for said cultivating means, a soil-treating crank arm in advance of said soil-treating and cultivating means and capable of swinging movement in a vertical plane substantially at right angles to the direction of propulsion, means connected to one end of said arm for imparting a crank movement to said arm, soil-treating and chopping means secured to the free end of said arm, an adjustable support on said frame, guiding means on said support for rockingly and slidably supporting said crank arm, a longitudinally extending adjusting lever adjustably and pivotally connected to said support, locking means operably connected to the other end of said support-adjusting lever, and coupling means intermediate the crank arm operating means and the propelling means.

9. In a soil and plant-treating machine as specified in claim 8, a spring actuated rack bar pivoted to the frame, and guiding means on said support-adjusting lever and adapted for the reception of said rack bar, the rack bar being engageable with the locking means for the support-adjusting lever.

In testimony whereof we affix our signatures in presence of two witnesses.

J. J. KRIEL.
O. J. KRIEL.

Witnesses:
ALBERT WALTERS,
O. H. AHLBERG.